Jan. 21, 1930.  A. E. WILSON  1,744,190
JOINTING SLEEVE OR FERRULE FOR ELECTRIC CABLES
Filed Jan. 5, 1926
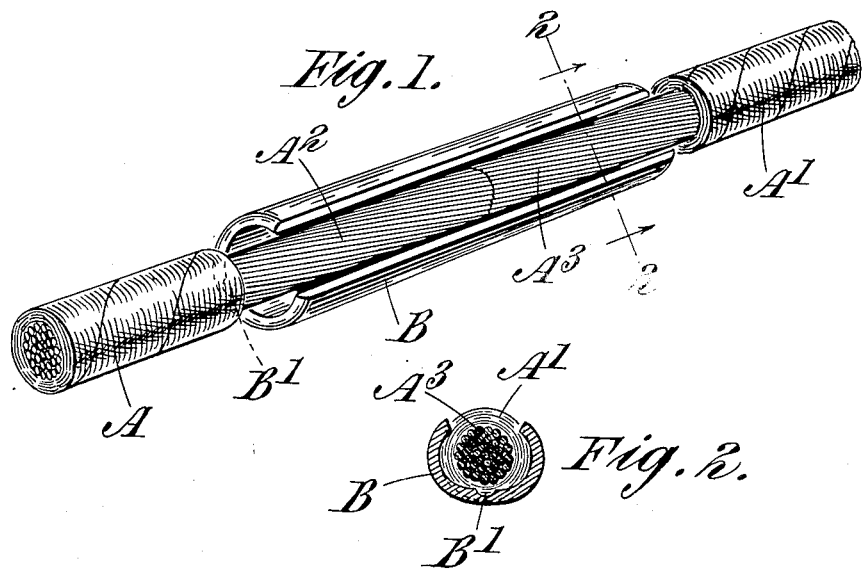
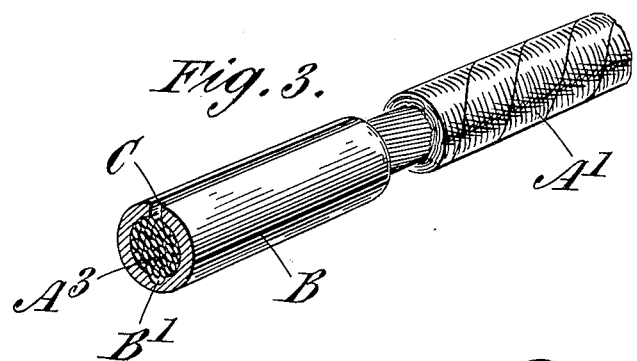
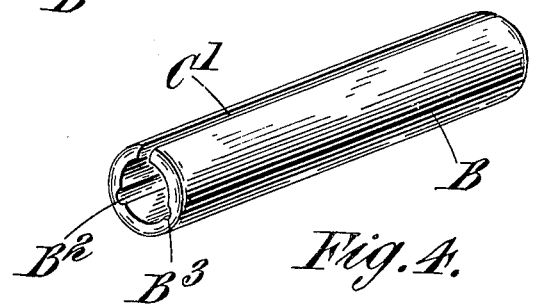
Inventor
A. E. Wilson
Watson, Coit, Morse & Grindle
Atty.

Patented Jan. 21, 1930

1,744,190

UNITED STATES PATENT OFFICE

ALFRED EDGAR WILSON, OF BROMLEY, ENGLAND

JOINTING SLEEVE OR FERRULE FOR ELECTRIC CABLES

Application filed January 5, 1926, Serial No. 79,436, and in Great Britain June 20, 1925.

This invention relates to jointing sleeves or ferrules for electric cables and has for its object to provide a one-piece ferrule which can be placed in position round the abutting ends of two cables in a junction or joint box without moving the cables and without removing so much insulation as is usually necessary.

Hitherto a one-piece ferrule has usually taken the form of a cylindrical tube or sleeve of cast or drawn metal, having a longitudinal slot and in using such a ferrule to connect two cables fixed in a junction or joint box, it has been necessary to remove from one of the cables an amount of insulation approximately equal to the length of the ferrule so that the ferrule could be clipped over the bared end and then brought back so as to enclose a sufficient length of the bared end of the other cable. This necessitated the reinsulation of the bare cable outside the ferrule, a matter involving in some instances considerable time and skill.

Divided ferrules, i. e. ferrules split longitudinally, have been used but the two parts of which they were made had necessarily to be clamped or held together whilst the joint was being made and the second split tended to allow the solder to flow through the joint instead of being retained within the ferrule.

A jointing sleeve or ferrule according to the present invention is made of cast, drawn or rolled metal, and is provided with one or more longitudinal grooves or thin portions so that the ferrule can be applied in an open position to the bared ends of the cables and closed round them by hand or other pressure, after which the joint can be made in the usual way.

Preferably the improved sleeve or ferrule is cylindrical in cross section and is of drawn high conductivity copper. It is formed with one or more internal longitudinal grooves and with a slot diametrically opposite to the groove if there is only one groove. The groove and the slot or either of them may be made after the ferrule is drawn or cast but preferably both of them are made in the drawing or casting process.

When made, the ferrule may have its substantially cylindrical shape in cross section, in which case it is opened at the slot by any suitable means. Alternatively, the ferrule when first made may have its open shape and comprise two substantially semi-cylindrical portions having sufficient clearance between their edges to admit the bared cable ends.

In either case the ferrule, after being placed in the proper position relatively to the cable ends, can be readily closed up round them to form a smooth cylindrical sleeve.

The ends of the ferrule are preferably chamfered or rounded as usual so that the whole surface may be smooth and free from projections.

In the accompanying drawings,

Figure 1 is a perspective view showing a ferrule according to this invention during the process of being placed in position round the abutting ends of two conductors,

Figure 2 is a cross section on the line 2—2 of Figure 1,

Figure 3 is a perspective view showing a portion of the ferrule in Figure 1 but closed round the conductors ready for the joint to be made, and Figure 4 is a perspective view of an alternative form of ferrule also according to this invention.

With reference first to Figures 1, 2 and 3, A and $A^1$ are cables having conducting cores $A^2$, $A^3$ which are to be joined in alignment. B is a ferrule or jointing sleeve made of cast, drawn or rolled metal having a longitudinal groove or thin portion $B^1$ to allow the ferrule to be closed round the bared conductors. When thus closed the ferrule is intended to be circular in cross section as shown in Figure 3, its edges nearly meeting and the space C between them forming a slot through which the molten metal for the joint can pass. When the ferrule is applied to the bared conductors this space between its edges is enlarged sufficiently to admit the conductors as may be seen in Figures 1 and 2, and the ferrule when made may, if desired, have the shape in cross section which is indicated in Figure 2. Alternatively, the ferrule before application may have a cross sectional shape similar to that of its finished form (Figure 3) and the slot C may be opened sufficiently to admit the conductors. In either case, as previously mentioned, it is closed round the conductors after application so as to leave merely a comparatively narrow slot at C.

As will be seen from Figure 1, the length of the improved ferrule approximates closely to the length of the two bared conductor ends. It is thus very suitable for use in jointing cables entering a junction box where it is often impossible to thread the bared ends into a closed tubular ferrule. The use of the improved ferrule as previously mentioned avoids the necessity of baring more of the conductors than is necessary for the joint, and the taping and insulation of the finished joint is thus facilitated.

Where, as in the example illustrated in Figures 1, 2 and 3 the ferrule has only one groove or thin portion $B^1$, that portion is preferably midway between the edges of the dividing slot C, but the ferrule may be made with more than one groove or thin portion and in the construction shown in Figure 4 there are two grooves $B^2$ and $B^3$. The ferrule shown in this figure is an example of one made initially with a circular cross section, and the slot or space $C^1$ would in such a case be opened or enlarged before application to the bared conductors, the ferrule being then pressed round the conductors as previously described.

What I claim as my invention and desire to secure by Letters Patent is:—

As a new article of manufacture, a jointing sleeve or ferrule for electric cables comprising a tube of conducting material longitudinally slitted for its full length, a longitudinal groove on the inner side of the tube, remote from said slit, forming a sleeve having a pair of thick walled sections joined by a thin walled section, whereby said sleeve may be opened by bending the thin walled section and closed without losing its original cross section.

In testimony whereof I have signed my name to this specification.

ALFRED EDGAR WILSON.